(12) United States Patent
Budd et al.

(10) Patent No.: US 11,344,757 B2
(45) Date of Patent: May 31, 2022

(54) AUTOMATIC MAIN ENGINE FIRE BOTTLE DISCHARGE FEATURE—DUAL CHANNEL DESIGN

(71) Applicant: LOCKHEED MARTIN CORPORATION, Bethesda, MD (US)

(72) Inventors: Timothy R. Budd, Stratford, CT (US); Mark P. Eisenhauer, Milford, CT (US); Thomas B. Priest, Orange, CT (US); Stephen B. Povroznik, III, Milford, CT (US); Lisa A. DeLise, Guilford, CT (US); Therese-ann B. Ngaya, Stratford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 17 days.

(21) Appl. No.: 16/925,444

(22) Filed: Jul. 10, 2020

(65) Prior Publication Data

US 2022/0008769 A1    Jan. 13, 2022

(51) Int. Cl.
*A62C 3/08* (2006.01)
*B64D 45/00* (2006.01)
*A62C 35/13* (2006.01)

(52) U.S. Cl.
CPC ............... *A62C 3/08* (2013.01); *A62C 35/13* (2013.01); *B64D 45/00* (2013.01); *B64D 2045/009* (2013.01)

(58) Field of Classification Search
CPC .......... A62C 3/08; A62C 35/13; B64D 45/00; B64D 2045/009
USPC ..................................................... 169/60–62
See application file for complete search history.

(56) References Cited

U.S. PATENT DOCUMENTS

| 2,353,765 | A | * | 7/1944 | Mathisen | ................ | A62C 3/08 169/61 |
| 2,573,335 | A |   | 10/1951 | Hodgins et al. | | |
| 4,566,542 | A |   | 1/1986 | Enk et al. | | |
| 2001/0019089 | A1 | | 9/2001 | Happ | | |
| 2002/0030136 | A1 | | 3/2002 | Chiu | | |

FOREIGN PATENT DOCUMENTS

JP          08150225 A      6/1996

* cited by examiner

*Primary Examiner* — Christopher S Kim
(74) *Attorney, Agent, or Firm* — Foley & Lardner LLP

(57) ABSTRACT

According to an aspect, a fire suppressant system includes a first fire bottle in operable communication with a first cockpit control switch via a first channel, and a first sensor-based switch via a second channel. Additionally, the fire suppressant system includes a second fire bottle in operable communication with a second cockpit control switch via a third channel, and a second sensor-based switch via a fourth channel.

20 Claims, 3 Drawing Sheets

AUTOMATIC MAIN ENGINE FIRE BOTTLE DISCHARGE FEATURE—DUAL CHANNEL DESIGN

BACKGROUND

Exemplary embodiments relate to the art of aircraft fire suppressant systems, and more particularly, to a main engine dual-channel fire bottle discharge.

Aircraft are equipped with fire bottles adjacent to their engine compartments to suppress fires during airborne and grounded cases. In certain airborne cases, multiple or all of the fire bottles are discharged automatically and without crew input, which depletes the available fire suppressing agent for future fires.

BRIEF DESCRIPTION

According to one embodiment, a fire suppressant system includes a first fire bottle in operable communication with a first cockpit control switch via a first channel, and a first sensor-based switch via a second channel. Additionally, the fire suppressant system includes a second fire bottle in operable communication with a second cockpit control switch via a third channel, and a second sensor-based switch via a fourth channel.

In addition to one or more of the features described above or below, or as an alternative, the first sensor-based switch and the second sensor-based switch are a same type of sensor-based switch.

In addition to one or more of the features described above or below, or as an alternative, the first-sensor based switch and the second sensor based switch are different types of sensor-based switches.

In addition to one or more of the features described above or below, or as an alternative, the first and second sensor-based switches have a same criteria for discharging the first and second fire bottles.

In addition to one or more of the features described above or below, or as an alternative, the first and second sensor-based switches have different respective criteria for discharging the first and second fire bottles.

In addition to one or more of the features described above or below, or as an alternative, the first and second sensor-based switches comprise thermal-based sensors.

In addition to one or more of the features described above or below, or as an alternative, the first and second sensor-based switches comprise force-based sensors.

In addition to one or more of the features described above or below, or as an alternative, the first sensor-based switch comprises a thermal-based sensor and the second sensor-based switch comprises a force-based sensor.

In addition to one or more of the features described above or below, or as an alternative, the fire suppressant system further comprises an override circuit operable to discharge the second fire bottle based on a proximity to an aircraft facility.

In addition to one or more of the features described above or below, or as an alternative, a decision of the override circuit to discharge the second fire bottle is based at least in part of a probability of a discharge from the first fire bottle not suppressing a fire.

In addition to one or more of the features described above or below, or as an alternative, a decision of the override circuit to discharge the second fire bottle is based at least in part of a probability of an additional fire.

In addition to one or more of the features described above or below, or as an alternative, the first cockpit control switch is a pilot's cockpit control switch and the second cockpit control switch is a co-pilot's control switch.

In addition to one or more of the features described above or below, or as an alternative, the first fire bottle and the second fire bottle are arranged adjacent to an aircraft engine compartment.

In addition to one or more of the features described above or below, or as an alternative, the first and second sensor-based switches are a same sensor-based switch.

In addition to one or more of the features described above or below, or as an alternative, the first and second-sensor based switches are different sensor-based switches.

In addition to one or more of the features described above or below, or as an alternative, a criteria for discharging the first bottle is detecting a temperature within a first temperature range.

In addition to one or more of the features described above or below, or as an alternative, a criteria for discharging the second bottle is detecting a temperature within a second temperature range.

In addition to one or more of the features described above or below, or as an alternative, the first temperature range and the second temperature range are distinct temperature ranges.

In addition to one or more of the features described above or below, or as an alternative, the first temperature range and the second temperature ranges partially overlap.

According to another embodiment, an aircraft includes a fire suppressant system that comprises a first fire bottle in operable communication with a first cockpit control switch via a first channel, and a first sensor-based switch via a second channel. Additionally, the fire suppressant system includes a second fire bottle in operable communication with a second cockpit control switch via a third channel, and a second sensor-based switch via a fourth channel, where each fire bottle is arranged adjacent to a main engine compartment of the aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses are presented herein by way of exemplification and not limitation with reference to the Figures.

Figure 1:
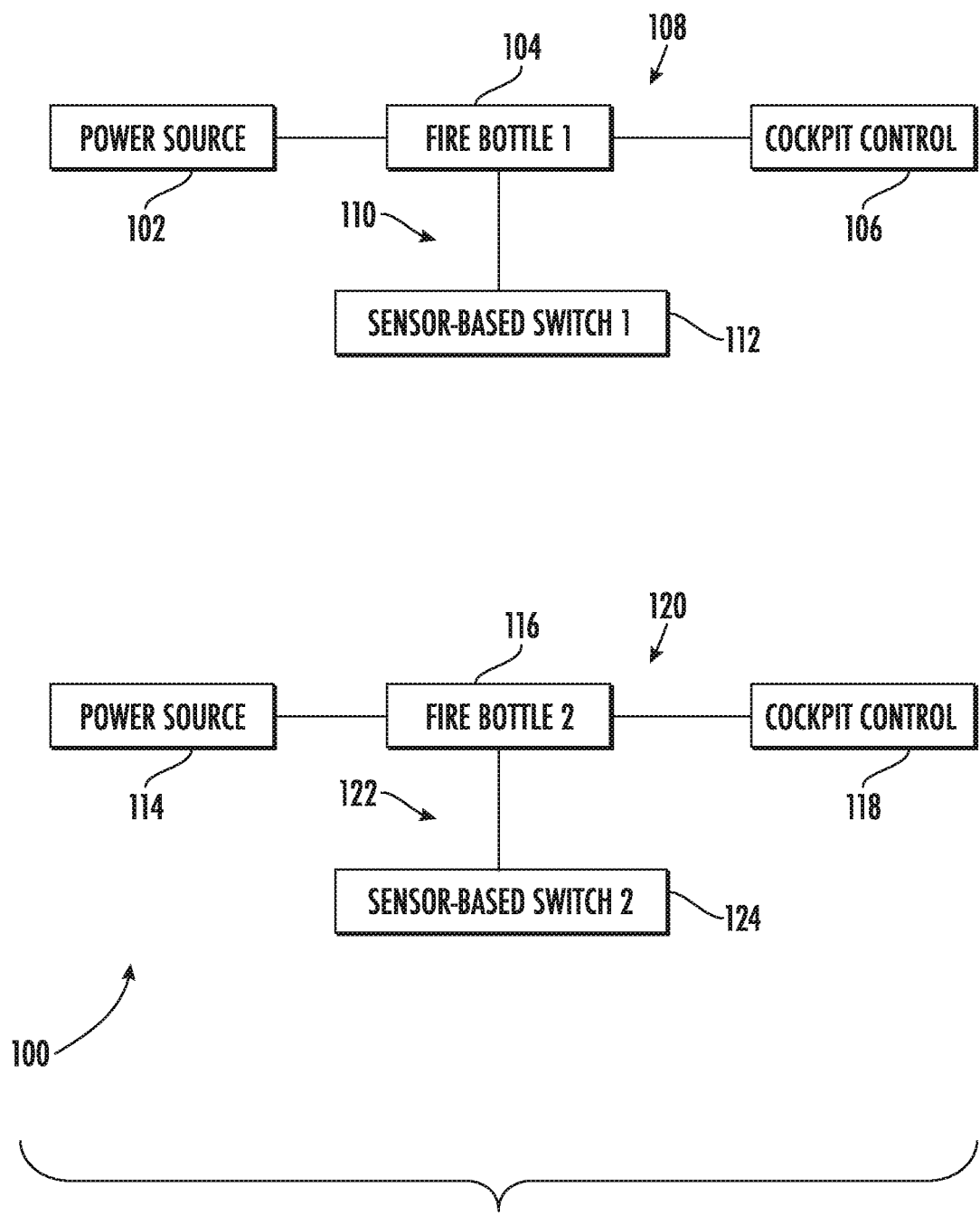
FIG. 1 depicts an aircraft fire suppressant system in accordance with an exemplary embodiment.

Referring to FIG. 1, a dual-channel fire suppressant system 100 is shown. A respective power source 102, 114 is operable to supply power to a first fire bottle 104 and a second fire bottle 116. Each fire bottle 104, 116 contains a fire suppressing agent capable of suppressing a fire caused by, for example, an electric source, a combustible source, or a flammable substance. Each aircraft engine 22 has its own fire suppressant system 100 adjacent to a respective engine compartment. The fire extinguishing system 100 typically includes a pair of fire bottles 104, 116 (or a pair for each engine), which supply a suppressing agent (for example, Halon 1301 or a Hydro-fluoro-compound) to an engine 22. The fire suppressant system 100 of each engine 22 displays the status via each cockpit control console 106, 118, which notifies of any engine fire. In the event of a fire, either a first crew member or a second crew member may initiate discharge of a fire bottle 104, 116 by pulling a fire handle on their respective cockpit control console 106, 118. The fuel flow to the engine 22 is then shut off, and an explosive cartridge attached to fire bottle is fired in the fire bottle 104, 116, releasing the suppressing agent into the engine 22. Each fire bottle 104, 116 may further include a fire suppressing tubing to direct the suppressing agent throughout the engine compartment.

The first fire bottle 104 is in operable communication with the cockpit control console 106 of a first crew member, for example, the pilot, via a first channel 108 and a first sensor-based switch 112 via a second channel 110. A channel is any wire, bus, or wireless apparatus that is operable to transmit a signal from the cockpit control console and a sensor-based switch to a fire bottle. The first fire bottle 104 may be manually discharged by a command entered into the cockpit control console 106 by a first crew member, and may be automatically discharged by the first sensor-based switch 112. The second fire bottle 116 is connected to the cockpit control console 118 of a second crew member, for example, the co-pilot, via a third channel 120 and to a second sensor-based switch 124 via a fourth channel 122. The second fire bottle 116 may be manually discharged by a command entered into the cockpit control console 118 by a second crew member, and may be automatically discharged by the second sensor-based switch 124. It should be appreciated that FIG. 1 illustrates two fire bottles 104, 116 the fire suppressant system 100 can include any number of fire bottles greater than two.

By incorporating dual discharge channels, the fire suppressant system 100 permits both manual and automatic fire bottle discharge, therefore the crew members can choose to manually discharge only the first fire bottle 104 and preserve the second fire bottle 116 for future discharge. This enables crew members to use their experience to determine whether more than one fire bottle should be discharged or should each fire bottle be preserved for later use. Therefore, during an airborne fire, a crew member may determine to discharge one fire bottle and allow at least one other fire bottle to remain full in case of a subsequent fire.

The sensor-based switches permits the fire suppressant system 100 to be configured to override or replace the crew's decision, in the event that a pre-determined condition is met. For example, the sensor-based switch may include a thermal sensor, operable to discharge a fire bottle in the event that the temperature exceeds a threshold value. In one instance, even if an aircraft crew chooses not to deploy one or more fire bottles, the sensor-based switch may automatically discharge a fire bottle if the temperature exceeds the threshold value. In another instance, if a crew member's cockpit controls are malfunctioning, or for some reason, the crew member cannot reach the console, the sensor-based switch may automatically discharge the fire bottle.

In some embodiments, the first sensor-based switch 112 and the second sensor-based switch 124 are the same sensor-based switch. In other embodiments, the first sensor-based switch 112 and the second sensor-based switch are distinct switches 124. In the instance that both the first and second sensor-based switch 112, 124 are the same switch, a discharge signal will be transmitted from the switch to both fire bottles. In the instance that the first and second sensor-based switches 112, 124 are distinct, each switch will transmit a respective discharge signal to a fire bottle 104, 116.

In some embodiments, both sensor-based switches 112, 124 include a same type of sensor. However, the sensors may be configured to discharge each fire bottle based on a same or separate criteria. For example, one thermal-based sensor may discharge a fire bottle based on a temperature falling with a first range of temperature values. While another thermal-based sensor may discharge another fire bottle based on a temperate falling within a second range of temperature values. In one instance, the ranges may be distinct, for example, the first and second ranges do not overlap. In another instance, the ranges may partially overlap. For example, the ranges may include a third range of temperature values that fall within both the first and the second ranges.

Additionally, the sensor-based switches 112, 124 may have a same criteria for discharging a fire bottle. In other words, each sensor is configured to transmit a discharge signal to a respective fire bottle based on sensing the same criteria. For example, the criteria may include a force-based criteria. In the event that an aircraft experiences a collision, the aircraft will experience a gravitational force equivalent, commonly referred to as a "g-force". For example, the g-force experienced by an aircraft on impact may be 10 g. The force-based sensors may be configured to transmit discharge signals based on sensing a threshold g-force. In this sense, all of the fire bottles would discharge upon an indication of an impact, regardless of any crew member decision.

In some embodiments, the sensor-based switches 112, 124 include different types of sensors. In some instances, the sensors may be configured to discharge each fire bottle based on separate criteria. For example, the first sensor may be a thermal sensor and the second sensor may be a force-based sensor. Therefore, the fire suppressant system not only allows the crew members to employ individual decision making, but the sensors themselves employ different criteria to determine whether to discharge a fire bottle.

The dual-channel fire suppressant system 100 may be further configured to include an override circuit (not shown). In some instances, a crew may choose to discharge a first fire bottle 104 and preserve the second fire bottle 116. However, in certain instances, the aircraft may be relatively close to a facility, for example, an airbase. In these situations, both of the fire bottles 104, 116 may be discharged and then replaced at the facility. Therefore, in some instances, the aircraft is equipped with geolocation tracking apparatus software and is operable to determine a distance between the aircraft and the facility, and a velocity of the aircraft. The onboard processing system 202 determines how quickly the aircraft can reach the facility. Then based at least in part on the distance to the facility, discharge the second fire bottle 116, even if only the first fire bottle 104 was manually discharged and the second sensor-based switch 124 criteria has not been met. In some instances, the onboard processing system 202 applies to statistical methods to determine the probability that the first fire bottle 104 did not suppress the fire or that another fire will occur. The onboard processing system 202 then discharges the second fire bottle 116 based on a probability of another fire or lack of suppression of the first fire being greater than a threshold value.

Figure 2:
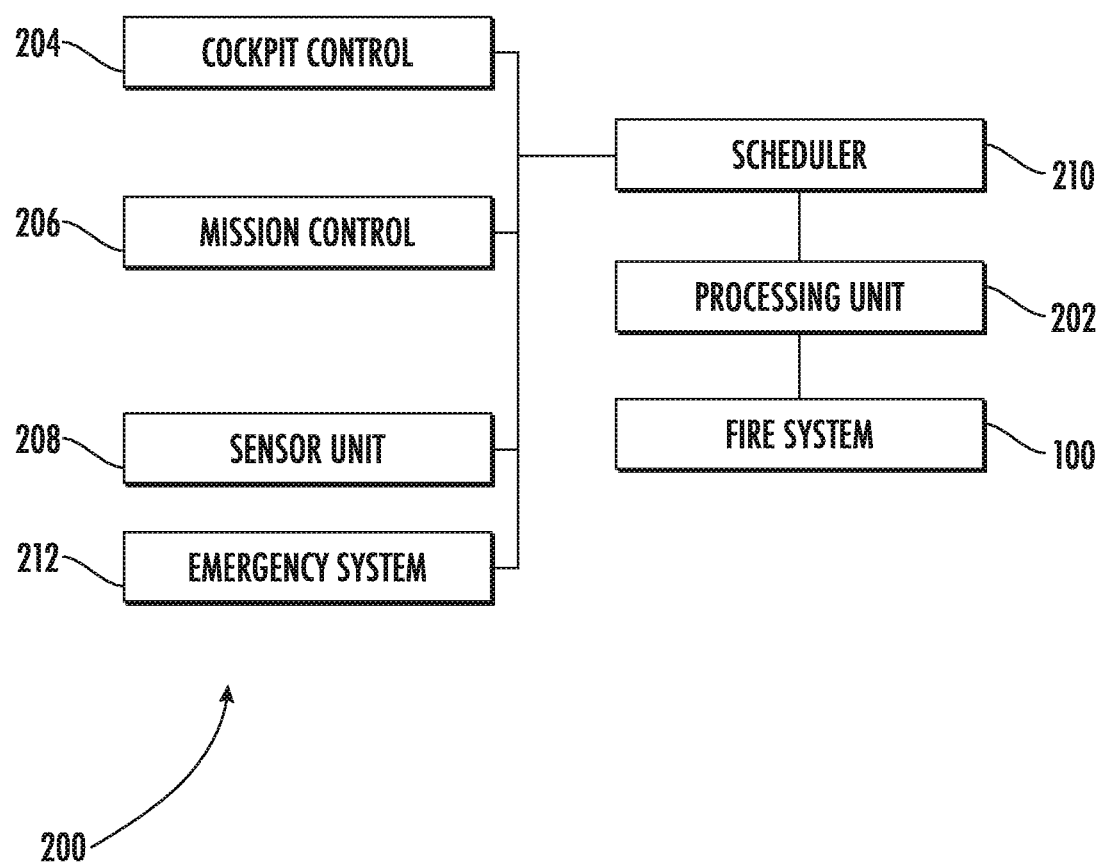
FIG. 2 depicts a illustrates a schematic view of an aircraft computing system in accordance with an exemplary embodiment.

Referring to FIG. 2, multiple subsystems of an aircraft system 200 are connected to an onboard processing unit 202 to allow aircraft operations. In an embodiment, the fire system 100 is in operable communication with a processing unit 202, and a scheduler 210 is in operable communication with a processing unit 202. Furthermore, the scheduler is in operable communication with the cockpit control 204, mission control 206, a sensor unit 208, which includes the first sensor-based switch 112 and the second sensor-based switch 124, and an emergency system 212. The processing unit 202 includes circuitry operable to perform the functions described herein, including discrete logic circuitry, a systems processor, or other appropriate processing system.

The aircraft system 200 may include, but is not limited to, cockpit control 204, mission control 206, and fire suppressant system 10. The cockpit control 204 may include components including, but not limited to, cockpit pedals, cockpit brakes, cockpit switches, engine controls, fire suppression controls, the first cockpit control console 106, the second cockpit control console 118, etc. Mission control 206 may include components including, but not limited to, mission planning components, etc. The fire suppressant system 100 may include components as described above.

Figure 3:
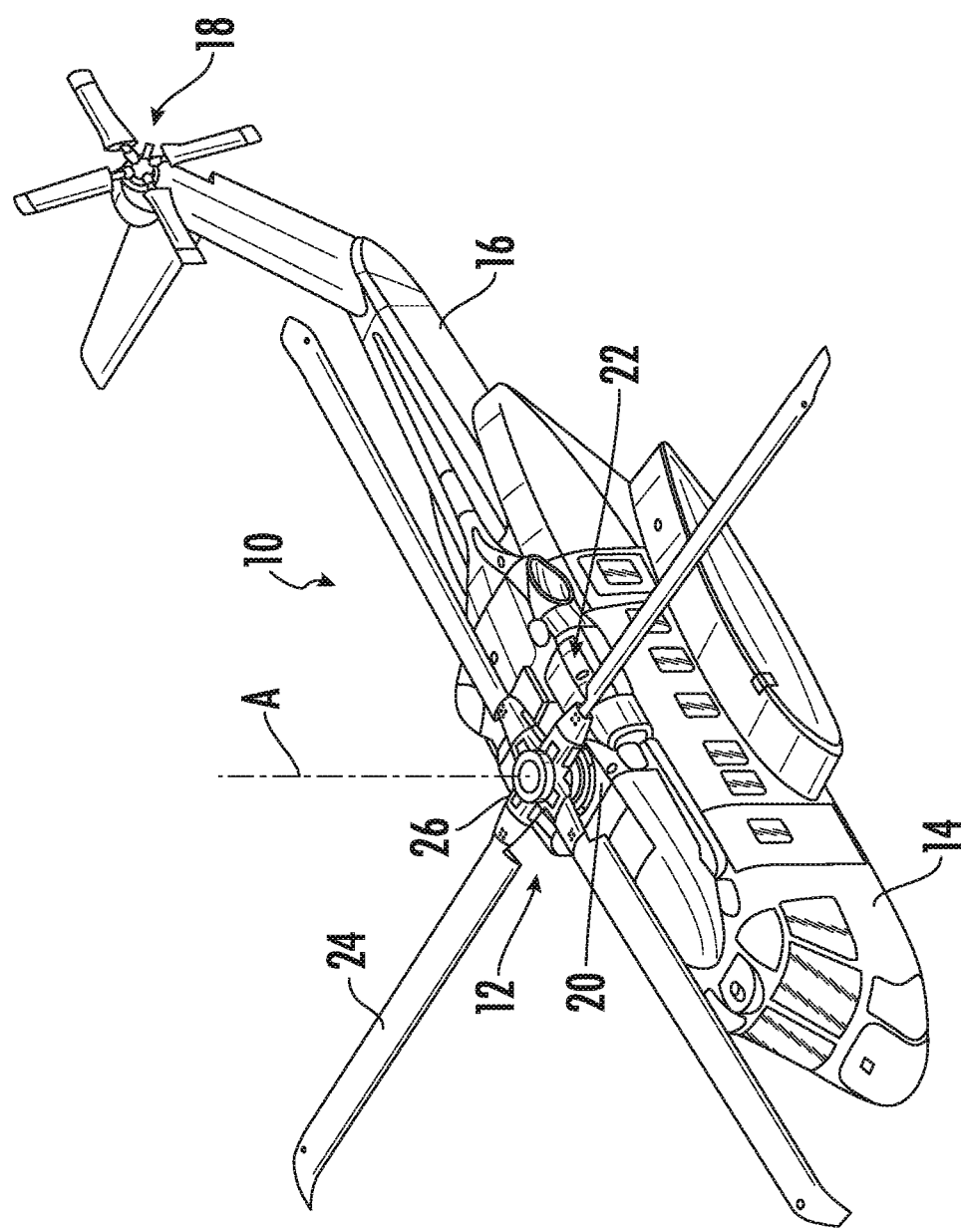
FIG. 3 depicts a schematic view of an aircraft in accordance with an exemplary embodiment.

With reference now to FIG. 3, an example of a vertical takeoff and landing (VTOL) aircraft is schematically illustrated. The aircraft 10 in the disclosed, non-limiting embodiment includes a main rotor assembly 12 supported by an airframe 14 having an extending tail 16, which mounts an anti-torque system/tail rotor (TR) system 18. The main rotor assembly 12 is driven about an axis of rotation A through a main rotor gearbox (MGB) 20 by one or more engines 22. The engines 22 generate the power available for flight operations and couple such power to the main rotor assembly 12 and the TR system 18 through the MGB 20. The main rotor assembly 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft, non-rotary wing aircraft, and fixed-wing aircraft.

Although a particular helicopter is illustrated and described in the disclosed embodiment, it will be appreciated that other configurations and/or machines including autonomous and optionally piloted aircraft that may operate in land or water including fixed-wing aircraft, rotary-wing aircraft, and land vehicles (e.g., trucks, cars, etc.) may also benefit from embodiments disclosed.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire suppressant system for an aircraft comprising:
a first fire bottle in operable communication with a first cockpit control switch via a first channel and a first sensor-based switch via a second channel; and
a second fire bottle in operable communication with a second cockpit control switch via a third channel and a second sensor-based switch via a fourth channel;
wherein the fire suppressant system is configured to be in communication with a processor within the aircraft, and
wherein at least one of the first fire bottle or the second fire bottle is configured to be controlled by the processor to discharge responsive to a determination of a statistical probability relating to a fire, the statistical determination being made by the processor.

2. The fire suppressant system of claim 1, wherein the first sensor-based switch and the second sensor-based switch each include a sensor configured to sense a same parameter.

3. The fire suppressant system of claim 1, wherein the first sensor-based switch and the second sensor-based switch respectively include a first sensor and a second sensor, the first sensor being configured to sense a different sensed parameter than the second sensor.

4. The fire suppressant system of claim 1, wherein the first and second sensor-based switches have a same criteria for discharging the first and second fire bottles.

5. The fire suppressant system of claim 1, wherein the first and second sensor-based switches have different respective criteria for discharging the first and second fire bottles.

6. The fire suppressant system of claim 1, wherein the first and second sensor-based switches comprise thermal-based sensors.

7. The fire suppressant system of claim 1, wherein the first and second sensor-based switches comprise force-based sensors.

8. The fire suppressant system of claim 1, wherein the first sensor-based switch comprises a thermal-based sensor and the second sensor-based switch comprises a force-based sensor.

9. The fire suppressant system of claim 1, wherein the processor is further operable to discharge the second fire bottle based on a distance between the aircraft and an aircraft facility associated with the aircraft.

10. The fire suppressant system of claim 9, wherein the statistical probability comprises a probability of a discharge from the first fire bottle not suppressing a fire.

11. The fire suppressant system of claim 9, wherein the statistical probability comprises a probability of an additional fire.

12. The fire suppressant system of claim 1, wherein the first cockpit control switch is a pilot's cockpit control switch and the second cockpit control switch is a co-pilot's control switch.

13. The fire suppressant system of claim 1, wherein the first fire bottle and the second fire bottle are in fluid communication with an aircraft engine compartment within the aircraft.

14. The fire suppressant system of claim 1, wherein the first and second sensor-based switches are a same sensor-based switch.

15. The fire suppressant system of claim 1, wherein the first and second-sensor based switches are different sensor-based switches.

16. The fire suppressant system of claim 1, wherein a criteria for discharging the first bottle is detecting a temperature within a first temperature range.

17. The fire suppressant system of claim 16, wherein a criteria for discharging the second bottle is detecting a temperature within a second temperature range.

18. The fire suppressant system of claim 17, wherein the first temperature range and the second temperature range are distinct temperature ranges.

19. The fire suppressant system of claim 17, wherein the first temperature range and the second temperature ranges partially overlap.

20. An aircraft comprising:
a fire suppressant system comprising:
 a first fire bottle in operable communication with a first cockpit control switch via a first channel and a first sensor-based switch via a second channel; and
 a second fire bottle in operable communication with a second cockpit control switch via a third channel and a second sensor-based switch via a fourth channel,
 each fire bottle being in fluid communication with a main engine compartment of the aircraft; and
 wherein the fire suppressant system is configured to be in communication with a processor within the aircraft, and
 wherein at least one of the first fire bottle or the second fire bottle is configured to be controlled by the processor to discharge responsive to a determination of a statistical probability relating to a fire, the determination being made by the processor.

* * * * *